United States Patent
Itabashi

(10) Patent No.: US 8,423,264 B2
(45) Date of Patent: Apr. 16, 2013

(54) VIBRATION DAMPING CONTROL DEVICE OF A DIESEL ENGINE VEHICLE

(75) Inventor: Kaiji Itabashi, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 380 days.

(21) Appl. No.: 12/682,907

(22) PCT Filed: Oct. 31, 2008

(86) PCT No.: PCT/JP2008/069884
§ 371 (c)(1),
(2), (4) Date: Apr. 14, 2010

(87) PCT Pub. No.: WO2009/057750
PCT Pub. Date: May 7, 2009

(65) Prior Publication Data
US 2010/0228465 A1 Sep. 9, 2010

(30) Foreign Application Priority Data
Nov. 1, 2007 (JP) ................................. 2007-285250

(51) Int. Cl.
*F02B 75/06* (2006.01)
*F02M 51/00* (2006.01)

(52) U.S. Cl.
USPC ...................................... 701/104; 123/192.1

(58) Field of Classification Search .............. 701/104, 701/37, 41, 48; 123/192.1, 192.2, 445
See application file for complete search history.

(56) References Cited

U.S. PATENT DOCUMENTS 5,101,786 A * 4/1992 Kamio et al. ................. 123/399
5,468,195 A * 11/1995 Kashiwabara .................. 477/46
(Continued)

FOREIGN PATENT DOCUMENTS

| CN | 1474046 A | 2/2004 |
| JP | 2004 168148 | 6/2004 |
| JP | 2006 69472 | 3/2006 |
| JP | 2008 100605 | 5/2008 |

OTHER PUBLICATIONS

Chinese Office Action for Chinese Application No. 200880113561.5 mailed Jan. 5, 2013, 5 pages.

*Primary Examiner* — Mahmoud Gimie
(74) *Attorney, Agent, or Firm* — Oblon, Spivak, McClelland, Maier & Neustadt, L.L.P.

(57) ABSTRACT

The vibration damping control device which performs damping of vibration of a vehicle body through a driving output control of a diesel vehicle in accordance with the present invention comprises a compensation component computing portion which computes a compensation component which compensates a wheel torque to suppress an amplitude of vehicle body vibration; and a control gain determining portion which determines a control gain for the compensation component, wherein, at a time point of reversion of the sign of the value of the compensation component, the control gain determining portion decreases the control gain when, before that time point, the value of the compensation component has deviated from a restriction range for variation of a fuel injection quantity determined based on engine operational condition, and increases the control gain when the value of the compensation component has not deviated from a restriction range for variation of a fuel injection quantity. Thereby, in the execution of the restriction of the fuel injection quantity variation, the wave form of the compensation component of the vibration damping control is maintained, and also, the effect of the vibration damping control becomes as large as possible.

8 Claims, 7 Drawing Sheets

U.S. PATENT DOCUMENTS

| | | | |
|---|---|---|---|
| 7,347,184 B2 * | 3/2008 | Kuroda et al. | 123/434 |
| 7,571,712 B2 * | 8/2009 | Kuroda et al. | 123/434 |
| 2004/0107034 A1 * | 6/2004 | Togai et al. | 701/54 |
| 2005/0049761 A1 | 3/2005 | Kataoka et al. | |
| 2006/0041353 A1 * | 2/2006 | Sawada et al. | 701/37 |
| 2006/0052908 A1 | 3/2006 | Matsumoto et al. | |
| 2010/0198485 A1 * | 8/2010 | Ohtsuka et al. | 701/103 |
| 2010/0241305 A1 * | 9/2010 | Itabashi et al. | 701/34 |

* cited by examiner

Fig. 3
(A)
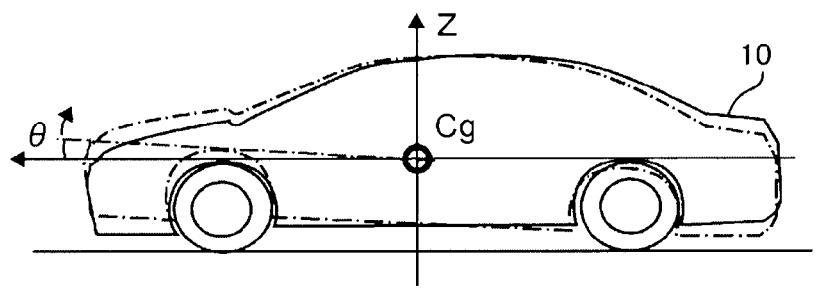
(B)
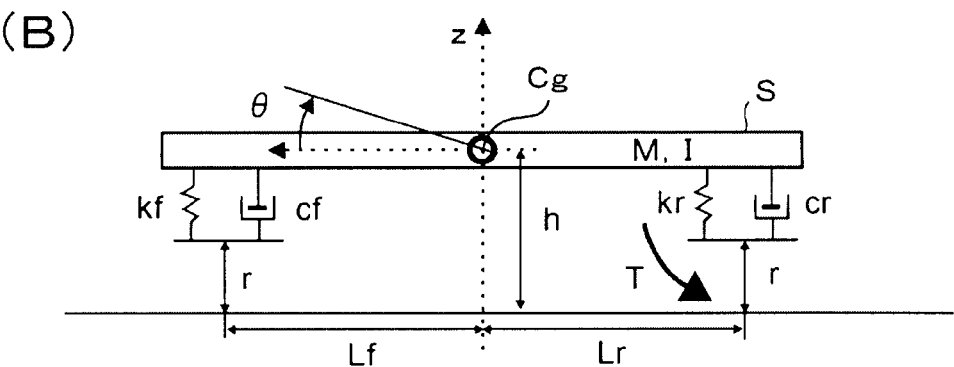
(C)
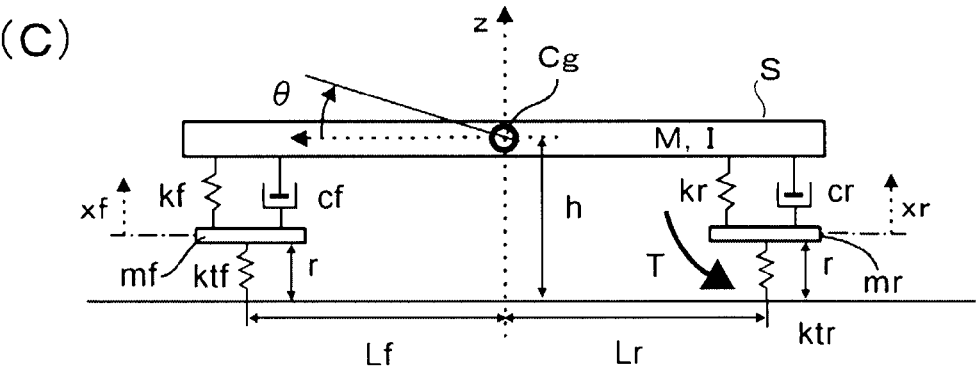

Fig. 4
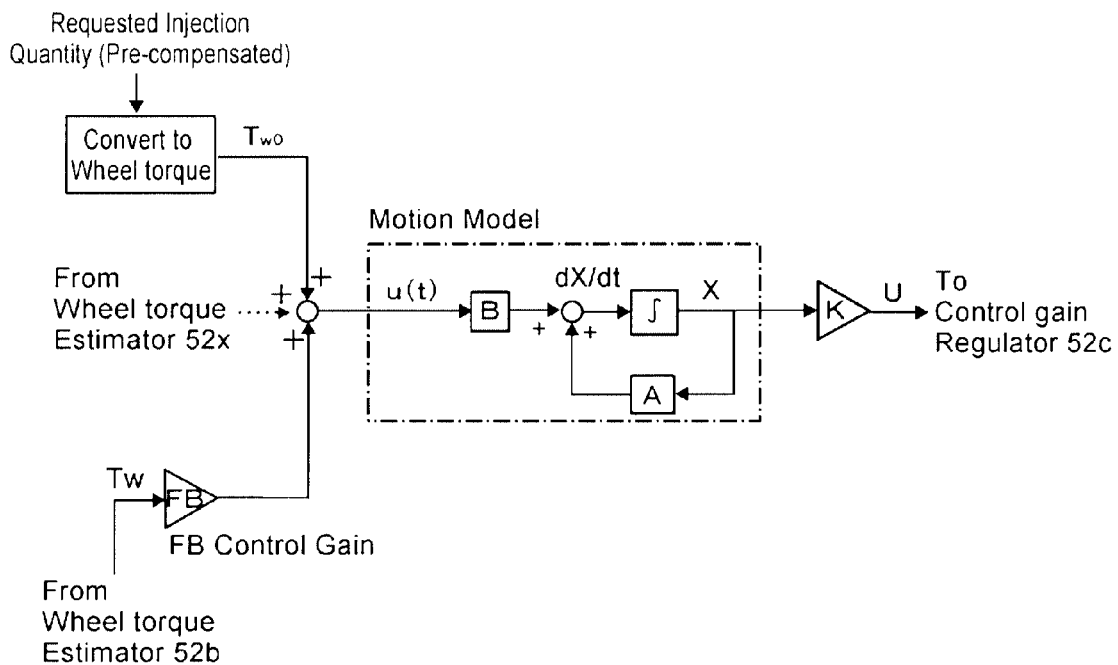
[Fig. 5]
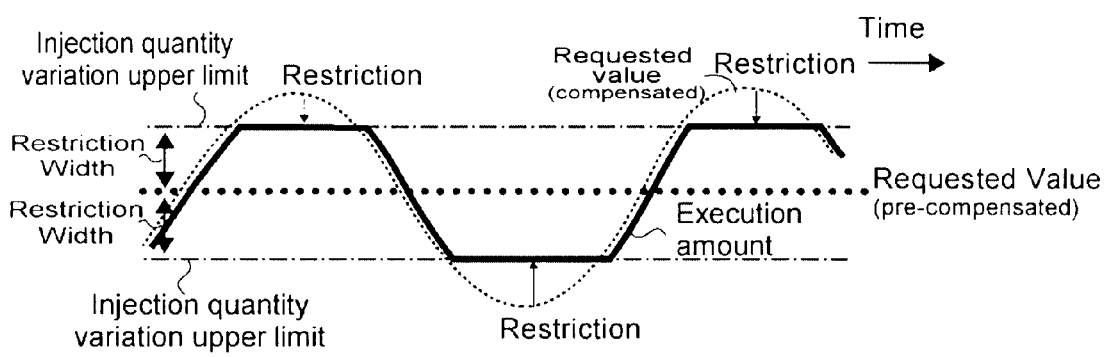

VIBRATION DAMPING CONTROL DEVICE OF A DIESEL ENGINE VEHICLE

TECHNICAL FIELD

This invention relates to a vibration damping control device of a vehicle, such as an automobile, more specifically to a vibration damping control device which controls a driving output (a driving force or a driving torque) of a vehicle having a diesel engine as a driving device so as to suppress vibration of a vehicle body, or a driving control device with such a vibration damping control function.

BACKGROUND ART

Vibration of a vehicle body during the running of the vehicle, such as pitching and bouncing vibration, etc., is generated owing to braking and driving forces (or an inertial force) and/or other external forces acting on a vehicle body at the acceleration and deceleration of a vehicle, which forces are reflected in a "wheel torque" which a wheel (particularly a driving wheel during driving) exerts on a road surface (a torque acting between a wheel and a contacted road surface). Then, in the field of vibration damping control for vehicles, it is proposed to suppress vibration of a vehicle body during the running of a vehicle by adjusting a wheel torque through a control of a driving output of an engine or other driving device of the vehicle (For example, see Patent documents 1 and 2). In such a vibration damping control through a driving output control, when an acceleration or deceleration demand of a vehicle is made or when an external force (a disturbance) has acted on a vehicle body to vary a wheel torque, pitching and bouncing vibration which would arise in a vehicle body is predicted by using a motion model constructed based upon an assumption of a dynamic model of so-called sprung mass vibration or sprung mass and unsprung mass vibration of a vehicle body, and then, the driving output of a driving device of the vehicle is adjusted so as to suppress the predicted vibration. In a case of such a type of vibration damping control, the generation of vibrational energy is suppressed by the adjustment of the source of the vibration-generating force, rather than by absorbing the generated vibrational energy like in the vibration damping control with suspensions, and therefore, the relatively prompt vibration damping effect and good energy efficiency are advantageously obtained. Further, in such a vibration damping control through a driving output control, the object to be controlled is focused into the driving output (driving torque) of a driving device, and thus, the adjustment in the control is relatively easy.

Patent document 1: Patent laid-open publication 2004-168148

Patent document 2: Patent laid-open publication 2006-69472

DISCLOSURE OF INVENTION

Objects to be Solved by Invention

During executing a vibration damping control through a driving output control, the output of a driving device is varied oscillationally in order to control a wheel torque for suppressing vibration of a vehicle body. Especially when the driving device of a vehicle is a diesel engine, a command value of a driving output (driving torque) to the engine is typically a requested value or a target value of a fuel injection quantity fed to the engine, and thus, in the execution of a vibration damping control, a fuel injection quantity is changed oscillationally. In this regard, in fuel injection quantity controls for diesel engines, there is a case in which it is required to set out a restriction for the variation width of a fuel injection quantity, and, in this case, it has been found that a variation of a fuel injection quantity (variation of a wheel torque) requested by a vibration damping control cannot be achieved, so that a vehicle body vibration cannot be well suppressed and, in some occasions, a request of a driving torque from a vibration damping control may induce an effect of amplification of a vehicle body vibration, such as a pitching and bouncing.

A fuel injection quantity actually supplied to a diesel engine needs to be adjusted so as to prevent occurrences of various unwanted conditions, such as the increase in substances like NOx, PM in exhaust gas, smoke generation, a catalyst melt loss due to operational depression of a catalyst control. Thus, in order to make a variation of a fuel injection quantity in a fuel injection quantity control of a diesel engine, it is preferable to restrict a variation of an execution amount of a fuel injection quantity within an allowable width of fuel injection quantity variation (width of driving torque variation) having been set out with reference to the current operational condition for avoiding unwanted conditions as described above. Namely, also in a case that a fuel injection quantity is controlled in accordance with a driving torque requested by a vehicle vibration damping control as described above, preferably, the variation amount of the fuel injection quantity owing to the vibration damping control is limited to the value based upon an allowable variation width set out in accordance with the engine's operational condition until then.

However, if a compensation component is restricted not to exceed beyond an allowable variation width, i.e., a restriction range as described above, a driving torque variation requested by a vibration damping control will not be achieved due to the leveling off of the variation at a limit, and under such a condition that the driving torque variation is leveled off, not only the magnitude of the requested value of the driving torque cannot be achieved, but also a wave form of temporal variation of a generated driving torque or wheel torque could be deformed.

Vibration of a vehicle typically contains many sine wave components of a resonance frequency (typically, 1.5-1.7 Hz in the case of sprung mass pitching and bouncing vibration), and thus, in response to the vehicle body vibration, the vibration damping control varies a driving torque so as to suppress or cancel that vibration. Accordingly, the compensation component for a driving torque in the vibration damping control usually consists of oscillating components containing many sine waves around the resonance frequency of vibration to be suppressed. However, if the compensation component is restricted so that an execution amount of a fuel injection quantity can fall within an allowable variation width and thereby its variation is leveled off at a limit, a fuel injection quantity corresponding to the oscillating driving torque to be generated by the compensation component of the vibration damping control would not be established, and thereby the frequency and phase of an actually generated wheel torque become different from the frequency and phase of a wheel torque scheduled by the vibration damping control, or in the wheel torque, there can arise a frequency component which does not suppress but amplify the vibration of the vehicle body. Thus, in the execution of a vibration damping control through a driving output control, it is necessary to adjust the magnitude of a compensation component for a driving torque in accordance with the vibration damping control so as to prevent the leveling off of the wave form of the compensation component due to the restriction of a variation width of a fuel injection quantity.

The leveling off at a limit of the wave form of a compensation component of a vibration damping control due to the restriction of variation of a fuel injection quantity as described above can be avoided by reducing a control gain of the compensation component for a driving torque of the vibration damping control, namely, the gain which determines the magnitude of the compensation component for the driving torque of the vibration damping control in the control command for a fuel injection quantity fed to an engine so as to prevent the compensation component for the driving torque of the vibration damping control from exceeding beyond the allowable variation width for the fuel injection quantity. However, an allowable variation width for a fuel injection quantity in an injection quantity control of a diesel engine, in general, widely changes depending upon the operational condition of the engine, and thus, the width of a region where the allowable variation width is small can be reduced to about 1/10 of the width of a region where the allowable width of variation is large. Consequently, if a control gain is set to a value reduced so as to prevent the occurrence of the leveling off of the wave form of a compensation component in any engine's operational areas, the operational effect of a vibration damping control will become small.

Accordingly, one of the objects of the present invention is to provide a vibration damping control device for performing a vibration damping control through a driving output control in a diesel engine vehicle, which device provides variation of a driving torque for suppressing or cancelling a vehicle body vibration while taking into account that the width of variation of an execution amount of a fuel injection quantity of the diesel engine is restricted in accordance with a present operational condition of the engine.

Further, another object of the present invention is to provide such a vibration damping control device in which a control gain of a compensation component for a driving torque of a vibration damping control is set out appropriately, so that the frequency and phase of the wave form of the compensation component for the driving torque of the vibration damping control will be maintained, and also, the operational effect of the vibration damping control will become as large as possible, even if an allowable variation width for a fuel injection quantity varies according to an operational condition of the engine.

The Means for Solving Objects

According to the present invention, there is provided a vibration damping control device which suppresses vibration of a vehicle body, such as pitching and bouncing, through a driving output control in a diesel engine vehicle, wherein a control gain is increased or decreased so as to avoid, or to suppress as little as possible, the leveling off of a compensation component for a driving torque of the vibration damping control even when a change of an allowable variation width for a fuel injection quantity occurs, and thereby so as to maintain the frequency characteristic and phase characteristic of the compensation component and also to make the operational effect of the vibration damping control developed as much as possible.

The inventive vehicle vibration damping control device for suppressing vibration of a vehicle body by controlling a driving output of a vehicle having a diesel engine as a driving device comprises a compensation component computing portion which, based on a wheel torque generated on a ground contact site of a wheel of the vehicle and a road surface and acting on the wheel, computes a compensation component which compensates the wheel torque to suppress an amplitude of the vibration of the vehicle body; and a control gain determining portion which determines a control gain of the compensation component in superimposing the compensation component on a requested value of a driving torque (a requested driving torque or a requested injection quantity) to the engine. Thus, basically, the vibration damping control device operates to compensate a driving output (driving torque) of the driving device so as to reduce or cancel vibration of a vehicle body (typically, pitching and bouncing vibration) which can be generated owing to braking and driving demands (or turning demand) by a driver or by an automatic operation control, or owing to a disturbance acting on the vehicle body during the running of the vehicle. Accordingly, by superimposing a compensation component computed in the compensation component computing portion on a requested value of a driving torque given to the engine, components (vibromotive forces) which would cause vibration of the vehicle body in the requested value of the driving torque are reduced or removed, or the driving torque is controlled in the direction to cancel actions of components (vibromotive forces) which would induce vibration of the vehicle body in the disturbance acting on the vehicle body.

In the case of a diesel engine, however, as already described, it is necessary to restrict fuel injection quantity's transient variation for the purposes of a combustion improvement for exhaust cleaning, a catalyst control of exhaust system, etc., where its restriction range is increased and decreased according to the operational condition of the engine at that time (typically determined by an engine rotational number and a fuel injection quantity). Therefore, in order to achieve a vibration damping control preferably or appropriately, it is preferable to variably adjust a control gain depending upon the restriction range to prevent the leveling off and the unnecessary reduction of the amplitude, instead of fixing the control gain.

Thus, according to the first aspect of the inventive device, the control gain determining portion is adapted such that, at a time point of a reversion of a sign of a value of a compensation component, the control gain determining portion decreases a control gain if the compensation component value has deviated from a restriction range for variation of a fuel injection quantity determined based on a operational condition of the engine in a term between the present time point and a preceding time point of a reversion of a sign of a value of the compensation component (a half oscillational cycle), and increases the control gain if the compensation component value has not deviated from the restriction range for variation of the fuel injection quantity of the engine in said term. The decrement and the increment of a control gain here each may be constant; however, with respect to the decrement of the control gain, this decrease should be executed quickly when it is required, and therefore, it may be determined according to the deviation amount of the compensation component from a restriction range for variation of a fuel injection quantity.

According to the control gain determining portion as described above, a control gain is decreased when a compensation component value by the vibration damping control deviates from a restriction range for variation of a fuel injection quantity, and the control gain is increased when the compensation component value does not deviate from the restriction range. That is, in this case, the control gain is set so as to increase or to decrease depending upon the relation between a restriction range for variation of a fuel injection quantity and the variation of the fuel injection quantity corresponding to the compensation component. With this manner, strictly speaking, just before the decreasing of a control gain, a compensation component value deviates from a restriction range for variation of a fuel injection quantity; however, after this, the compensation component is decreased so as not to suffer the restriction for the variation of the fuel injection quantity, so that, substantially, the wave forms of varying components corresponding to the compensation component of the vibration damping control can be reflected, with almost no deformation of the wave form (with almost no changing of the frequency characteristic and phase characteristic) and also without unnecessary decrease of the oscillational amplitude, in the requested value or execution amount of a fuel injection quantity, as a control command, given to the engine.

In this regard, as described above, preferably, the changing of a control gain is performed at a time point when the sign of a compensation component value is reversed. At the time point of the reversion of the sign of a compensation component value, the compensation component value becomes 0, and thus, advantageously, the compensation component can be smoothly varied around before and after the change of the control gain, and also the avoiding of a sudden change of a driving torque or a wheel torque corresponding to the compensation component will become easy. Accordingly, as understood from the above-mentioned structure, in the first aspect of the present invention, if a compensation component value deviates from a restriction range for variation of a fuel injection quantity, the decreasing of a control gain will be executed at the first time point of the reversion of the sign of the compensation component value after the occurrence of the deviation. And, at a time point of the reversion of the sign of a compensation component value, if the compensation component value has not deviated from a restriction range for variation of a fuel injection quantity between the present time point and the time point of the preceding reversion of the sign of the compensation component value, the increase of a control gain is executed.

Furthermore, regarding the change of a control gain in the first aspect of the present invention, while the decrease of a control gain should be quickly executed, the increase of the control gain is not needed to execute immediately after a compensation component value does not deviate from a restriction range for variation of a fuel injection quantity. Rather, if a once decreased control gain is increased immediately, a compensation component value would deviate again from a restriction range for variation of a fuel injection quantity immediately after the increase, and then the increase and decrease of the control gain could be repeated frequently (In such a case, a turbulence could be induced in the wave form of a wheel torque after all). Thus, in the first aspect of the present invention, in order to prevent the repetition of increase and decrease of a control gain, the increase of a control gain may be executed when a compensation component value has not deviated from the restriction range for variation of a fuel injection quantity of the engine during a predetermined number of times of occurrences of reversions of the sign of the compensation component value or for a predetermined duration.

Moreover, regarding the above-mentioned increase of a control gain, when the width of a restriction range for variation of a fuel injection quantity for the engine is set to a predetermined maximum width for this restriction range, it is more highly probable that a wave form, not distorted, is reflected in an execution amount of the fuel injection quantity even when the amplitude of a compensation component is large, and therefore, after that, the control gain may be increased at the first time point of the reversion of the sign of the compensation component value. In a case that the increase of a control gain is executed after it is found that a compensation component value has not deviated from the restriction range for variation of a fuel injection quantity of the engine during a predetermined number of times of occurrences of reversions of the sign of the compensation component value or for a predetermined duration, the increase of the once decreased control gain is not sooner; however, if the control gain is increased immediately after the setting of the width of a restriction range for variation of a fuel injection quantity to its maximum width, then it is possible to enlarge the operational effect of the vibration damping control.

By the way, the prevention of the leveling off and unnecessary reduction of an amplitude of a compensation component of the vibration damping control can be achieved also by setting a control gain in accordance with the increase and decrease of a restriction range for a fuel injection quantity. Therefore, in the second aspect of the present invention, the control gain determining portion of the inventive vibration damping control device may be adapted to determine a control gain with a ratio of a presently set width of a restriction range for variation of a fuel injection quantity determined based on an operational condition of the engine to a predetermined maximum width of the restriction range. In this structure, the amplitude of a compensation component is increased and/or decreased depending upon the increase and decrease of the restriction range for a fuel injection quantity, and thereby the calculating process of a control gain is made relatively easy. Further, also in this case, in order to ensure the continuity of an execution amount of a fuel injection quantity around the change of a control gain, it is preferable to execute the determination of a control gain at a time point of the reversion of the sign of a compensation component value.

Thus, abstractly, according to the present invention, there is provided a vehicle vibration damping control device for suppressing vibration of a vehicle body by controlling a driving output of a vehicle having a diesel engine as a driving device, characterized in that an amplitude of a compensation component to be superimposed on a requested value of a driving torque of the vehicle for suppressing vibration of the vehicle body is varied based on a restriction range for variation of a fuel injection quantity determined based on an operational condition of the engine. Moreover, according to the present invention, there is provided a vehicle designed so that a driving torque of a diesel engine can be controlled to suppress vibration of a vehicle body, wherein a magnitude of a compensation component to be superimposed on a requested value of the driving torque of the vehicle so as to suppress the vibration of the vehicle body is changed based on a restriction range for variation of a fuel injection quantity of the engine.

Effect of the Invention

In general, according to the present invention, in a case of performing a vibration damping control through a driving output control in a diesel engine vehicle, a compensation component of the vibration damping control is reflected in an execution amount of a fuel injection quantity while the wave form is almost undistorted irrespective of the engine's operational area, thereby enabling the provision of an appropriate operational effect of the vibration damping control in the vehicle. Furthermore, even under a condition that a restriction range for variation of a fuel injection quantity is small so that an amplitude of a compensation component would exceed beyond the restriction range of variation of the fuel injection quantity in the prior art, the frequency characteristic and the phase of the compensation component are almost maintained, and thereby the generation of unexpected frequency components owing to the restriction of variation of the fuel injection quantity is prevented. And according to the present invention, there is no need to give up the execution of restriction of variation of a fuel injection quantity for the vibration damping control, and therefore, purposes such as a combustion improvement for exhaust cleaning and a catalyst control of exhaust system are ensured.

It should be understood in the above-mentioned inventive structure that, in any of the aspects, the mutually opposing purposes, i.e., the avoidances of the leveling off and the unnecessary reduction of the amplitude of a compensation component of a vibration damping control, are achieved by relatively easy operational processing. Especially, if one tries to directly compare an amplitude of a compensation component with a restriction range for a fuel injection quantity, there would be required such processes as to extract an amplitude from oscillating components of the compensation component which is varied with the magnitude of a braking and driving input or a steering input of a driver, etc., and a disturbance input; but, according to the present invention, without conducting such processes, the regulation of a control gain is enabled. In particular, in the first aspect of the present invention, a control gain is adjusted based on the relative magnitudes of an amplitude of a compensation component and a restriction range for variation of a fuel injection quantity, and thereby an amplitude of a compensation component may be increased as large as possible, and therefore, it is advantageous in that the range of the effects of the vibration damping control can be more enlarged.

The other objects and advantages of the present invention will become apparent in the explanation of the following preferable embodiments of the present invention.

BRIEF EXPLANATION OF THE DRAWINGS

FIG. 3 (A) is a drawing explaining state variables of vehicle body vibration to be suppressed in the vibration damping control device of one preferable embodiment of the present invention. FIG. 3 (B) is a drawing explaining about a sprung mass vibration model, i.e., a dynamic motion model of vibration of a vehicle body assumed in a vibration damping control device of a preferable embodiment of the present invention, and FIG. 3(C) is a drawing explaining about a sprung mass and unsprung mass vibration model.

FIG. 4 is a drawing showing a structure in a vibration damping control in a preferable embodiment of the present invention in a form of a control block diagram.

FIG. 5 shows a temporal change of an execution amount of a fuel injection quantity (solid thick line) in a case of performing a restriction process to a compensation component of the vibration damping control. The dotted line shows a temporal change in a case of superimposing the compensation component as it is on a requested injection quantity; the alternate long and short dash lines show the limiting values (upper limit value and lower limit value) for variation of the fuel injection quantity; and the round dotted line shows the value of a requested injection quantity on which the compensation component is not superimposed.

FIG. 7 (A) shows a case in which the increase or decrease of a control gain is executed for every half oscillational cycle of the compensation component; FIG. 7 (B) shows a case in which an increase of a control gain is executed after the condition without the occurrence of deviation of a compensation component value from the restriction range elapses for a predetermined duration; and FIG. 7 (C) shows a case in which a control gain is increased to its maximum when the restriction range for variation of a fuel injection quantity is set to its maximum width. In the drawings, at the time points designated "Decrease", the decreasing of a control gain is executed, and, at the time points designated "Increase", the increasing of a control gain is executed. At the time points designated "Hold", a control gain is held as it is.

BEST MODE OF THE INVENTION

Figure 1:
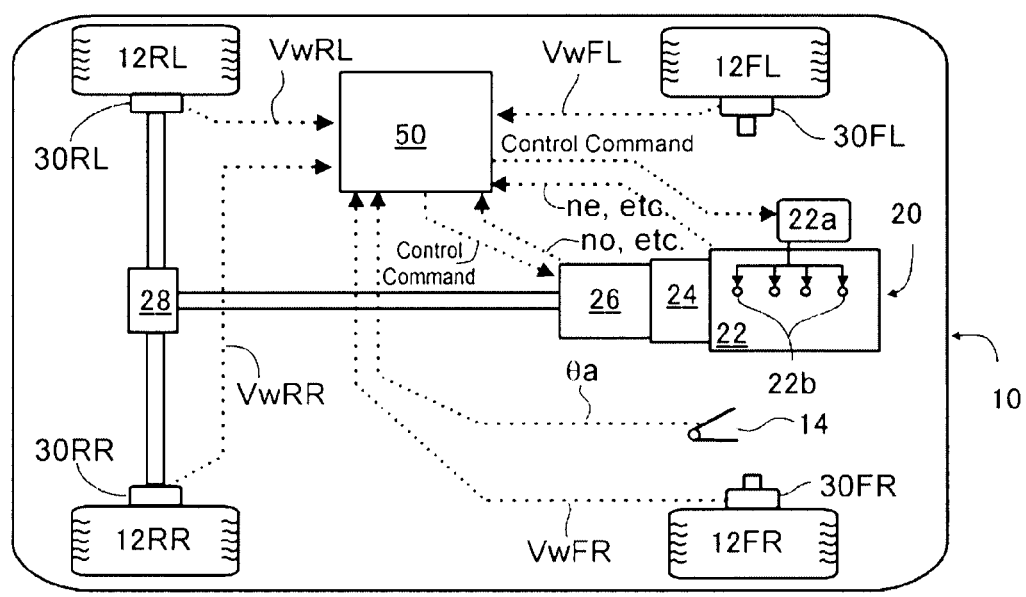
FIG. 1 shows a schematic diagram of an automobile in which a preferable embodiment of a vibration damping control device in accordance with the present invention is realized.

The present invention is explained in detail with respect several preferable embodiments, referring to the drawings accompanying in the following. In the drawings, the same reference numeral indicates the same portion.

Structures of the Device

FIG. 1 schematically shows a vehicle, such as an automobile, in which a preferable embodiment of the inventive vibration damping control device is installed. In this drawing, in the vehicle 10 having left and right front wheels 12FL and 12FR and left and right rear wheels 12RL and 12RR, there is installed a driving device 20 which generates a driving force or a driving torque in the rear wheels according to the depression of an accelerator pedal 14 by a driver in a usual manner. In the shown example, the driving device 20 is constructed such that a driving torque or a rotational driving force is transmitted from an engine 22 through a torque converter 24, an automatic transmission 26, a differential gear 28, etc., to the rear wheels 12RL and 12RR. The engine 22 is a diesel engine of a known type, in which, in order to attain a driving torque demand determined according to a depression amount of the accelerator pedal and a control amount explained later, the operation of a fuel system 22a is controlled to adjust fuel injection quantities from fuel injectors 22b of the respective engine cylinders and/or other parameters (the timing of fuel injection, an injection rate (a fuel injection quantity per unit time), an injection pressure, etc. Hereafter, those are in general referred to as "fuel injection control amounts"). In this regard, although not illustrated for the simplicity, the vehicle is provided with a braking device generating a braking force on each wheel and a steering device for controlling a steering angle of the front wheels or front and rear wheels as in a normal vehicle. Further, the vehicle may be a four-wheel drive vehicle or a front drive vehicle.

Control parameters of the driving output of the engine 22 (basically, fuel injection control amounts including a fuel injection quantity to each cylinder) are adjusted with commands of an electronic control device 50. The electronic control device 50 may include a microcomputer and drive circuits of a normal type, having a CPU, a ROM, a RAM, and input/output port devices mutually connected with bidirectional common bus. Into the electronic control device 50, inputted are signals indicating wheel speeds Vwi (i=FL, FR, RL, RR) from wheel speed sensors 30$i$ (i=FL, FR, RL, RR) installed in the respective wheels; signals from sensors provided on various parts in the vehicle, such as an engine's rotational speed ne, a depression amount of the accelerator pedal θa, an engine cooling water temperature (not shown), an engine lubricating oil temperature (not shown), a transmission's output rotational speed no, a lubricating oil temperature (not shown), a driver's shift lever position, etc. In this connection, it should be understood that, in addition to the above, various detected signals may be inputted for obtaining various parameters required for various controls to be executed in the vehicle of this embodiment.

Figure 2:
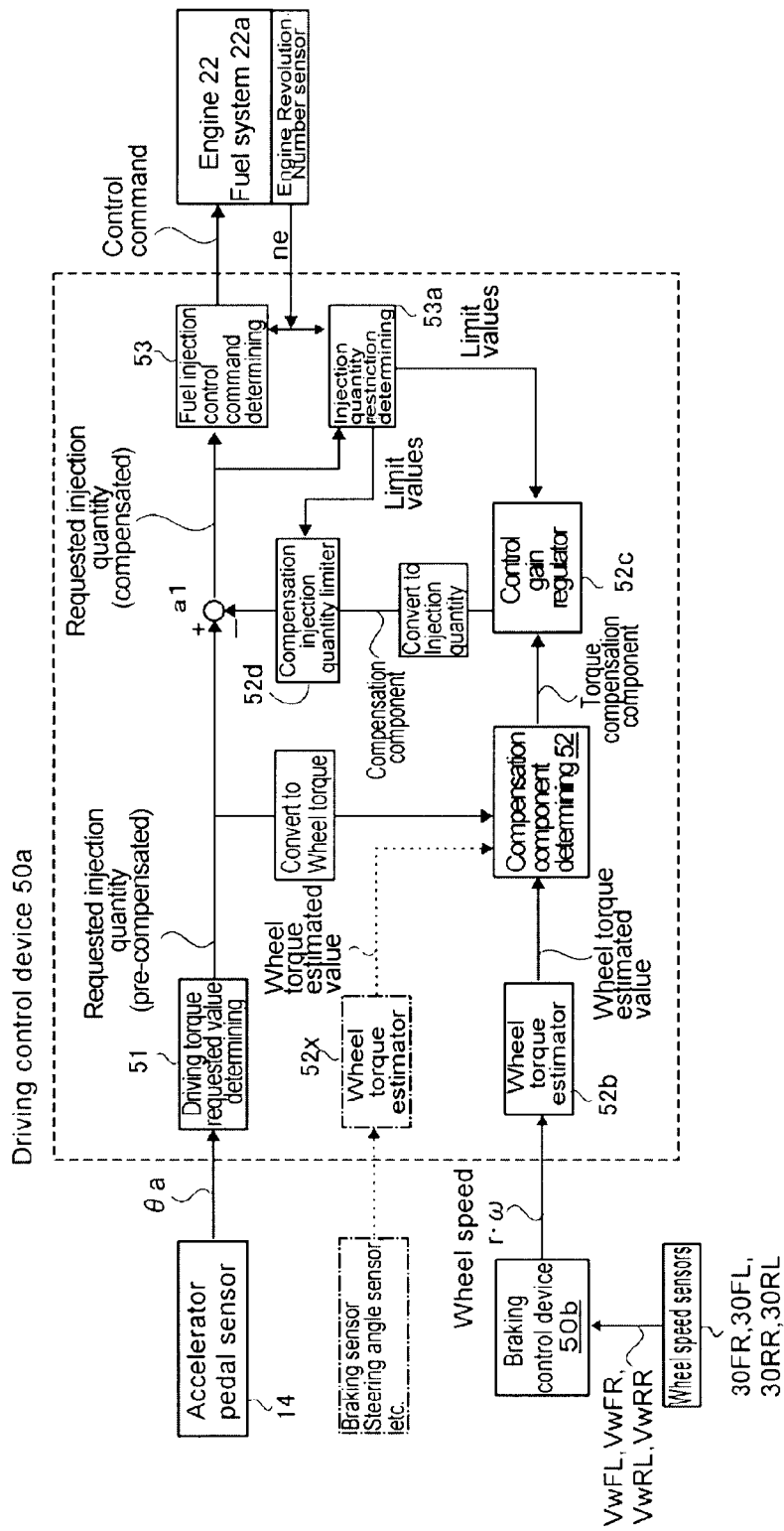
FIG. 2 is a schematic diagram of an internal structure of the embodiment of the electronic control device of FIG. 1. Into a driving torque requested value determining portion 51 and a fuel injection control command determining portion 53, various parameters other than the illustrated ones such as an engine temperature, etc. may be inputted.

FIG. 2 shows an inside structure of the electronic control device 50 in the form of control blocks. Referring to this drawing, the electronic control device 50 may be designed to comprise a driving control device 50$a$ which controls the operation of the engine, a braking control device 50$b$ which controls the operation of the braking device (not shown), and also control devices of various known kinds, equipped with an electronic control device for a diesel engine vehicle. In this regard, it should be understood that the structures and operations of the control devices of various kinds including the driving control device, etc. are realized in processes and operations of the microcomputer, etc. in the electronic control device 50 during the operating of the vehicle.

Into the braking control device 50$b$, as shown in the drawing, electrical signals of a pulse form, generated sequentially at every rotation of a predetermined amount in the respective wheels, are inputted from the wheel speed sensors of the respective wheels 30FR, FL, RR and RL; the rotational speed of each wheel is computed by measuring time intervals between the arrivals of sequentially inputted pulse signals; and a wheel speed value r·ω is computed out by multiplying the wheel's rotational speed by the corresponding wheel radius. Then, the wheel speed value r·ω is transmitted to the driving control device 50$a$, and used therein for computing a wheel torque estimated value. In this regard, the calculation from a wheel rotational speed to a wheel speed may be performed in the driving control device 50$a$. In this case, the wheel rotational speed is given from the braking control device 50$b$ to the driving control device 50$a$.

The driving control device 50$a$ comprises, as its basic structure, a driving torque requested value determining portion 51 to determine a requested value of an engine's driving torque requested by a driver based on the accelerator pedal depression amount θa from the accelerator pedal sensor (In the case of a diesel engine, a driving torque corresponds to a fuel injection quantity, and thus the unit of the requested value, employed here, is the unit of the requested injection quantity); a compensation component determining portion 52 to compute out a compensation component which compensates (corrects) the driving torque requested value for performing the vibration damping control through a driving torque control against pitching and bouncing vibrations in the vehicle body; and a fuel injection control command determining portion 53 to determine a control command for a driving apparatus (not shown) in each part of the engine or fuel system for attaining the driving torque requested value compensated with the compensation component based on its requested value.

In this basic structure, the driving torque requested value determining portion 51 may be designed to determine a requested injection quantity from the accelerator pedal depression amount θa or a demand of an automatic running control device in an arbitrary known manner. The compensation component determining portion 52, as illustrated in the drawing, receives a value obtained by converting a driving torque requested value (pre-compensated) determined based on the accelerator pedal depression amount θa, etc. to a value of wheel torque (wheel torque requested value), and an estimated value of an actually exerting wheel torque obtained by the estimation from a wheel velocity no) in a wheel torque estimator 52$b$; and then, in accordance with the manner explained in detail later, the portion 51 computes out a compensation component which reduces or cancels vibrational components in those wheel torque requested value and estimated value which could cause pitching and bouncing vibration on the vehicle body. In this regard, moreover, the compensation component determining portion may compute a compensation component for suppressing pitching and bouncing vibration which originates from wheel torque changes generating on a wheel owing to a braking operation or a steering operation by the driver. In that case, as illustrated by the dotted line in the drawing, a wheel torque estimated value, estimated based on a brake operation amount or a steering control amount in a wheel torque estimator 52$x$, is inputted into the compensation component determining portion, where the wheel torque estimated value is processed similarly to the requested driving torque value for computing a compensation component. The estimation of a variation amount of a wheel torque based on a braking operation amount or a steering operation amount may be done in an arbitrary known manner.

Then, a compensation component, computed by the compensation component determining portion 52, is multiplied by a control gain in a control gain regulator 52$c$, and superimposed on a driving torque requested value (pre-compensated) in an adder a1 through a compensation injection quantity limiter 52$d$. In this connection, usually, in a driving control device of a diesel engine, a fuel injection quantity is adjusted not to cause various unwanted conditions, such as increase of materials like NOx or PM, etc. in exhaust gas, smoke generation and catalyst melt loss due to operational depression of catalyst control. Thus, the requested injection quantity (pre-compensated), outputted from the driving torque requested value determining portion 51, is a value having been already adjusted to prevent generation of unwanted conditions as described above. While a compensation component of the vibration damping control induces further variation in this requested injection quantity (pre-compensated), this variation should be limited within a range in which no unwanted conditions as described above are developed (The allowable variation range for a fuel injection quantity for preventing the above-mentioned unwanted conditions varies depending upon the present operational condition of the engine). Therefore, the inventive control device is adapted to limit (to guard) a compensation component value with a compensation injection quantity limiter 52$d$ before the superimposition of the compensation component onto a driving torque requested value in order to make the compensation component value fall into a restriction range determined based upon the present operational condition of the engine (The restriction range is determined in an injection quantity restriction determining portion 53a). Moreover, when the guard is applied to the compensation component value, the variation of the compensation component would be made leveled off at a limit and its wave form would be deformed, and thereby a good vibration damping control is not achieved, or it is possible for the change of a frequency characteristic or a phase characteristic owning to the wave form change to generate unexpected frequency components in an execution amount of a fuel injection quantity. Thus, for preventing the wave form change of a compensation component, as noted, a control gain, whose magnitude is adjusted depending on the restriction range for the compensation component in the compensation injection quantity limiter 52d, is multiplied on the compensation component in the control gain regulator 52c. In this regard, the details of the control gain regulator 52c and compensation injection quantity limiter 52d are described later.

The fuel injection control command determining portion 53 receives a driving torque requested value compensated as described above, and, in a known manner, the portion 53 conducts the determination of control commands for the driving apparatus (not shown) of each part of the engine or its fuel system by means of experimentally or theoretically predetermined maps with reference to the driving torque requested value (compensated), a number of engine revolution and/or engine temperature at that time so as to achieve target values of a fuel injection quantity and other fuel injection control amounts, and the control commands are transmitted to the respective driving apparatus.

By the way, it should be understood that, although the control of a wheel torque is performed by control of a driving torque which is transmitted to a wheel from the driving device in the present embodiment, it may also be appropriately conducted by operating the braking device or steering device simultaneously.

Operations of the Device (i) Pitching and Bouncing Vibration Damping Control

In the above-mentioned structure, pitching and bouncing vibration damping control with a compensation component computed by the compensation component determining portion 52 in FIG. 2 may be performed in the following manner.

(The Principle of Vibration Damping Control)

In a vehicle, when a driving device operates based on a driver's drive demand to induce a variation of a wheel torque, there may arise in a vehicle body 10 the bouncing vibration in the perpendicular direction (the z direction) of the centroid Cg of the vehicle body and the pitching vibration in the pitch direction (the θ direction) around the centroid of the vehicle body as illustrated in FIG. 3(A). Moreover, when an external force or torque (a disturbance) acts on a wheel owing to change of a road surface condition or an influence of a wind during the running of the vehicle, the disturbance may be transmitted to the vehicle and vibration may also arise in the bounce direction and the pitch direction in the vehicle body. Thus, in the pitching and bouncing vibration damping control illustrated here, there is constructed a motion model of the pitching and bouncing vibration of a vehicle body, where displacements z and θ and their rates of change dz/dt and dθ/dt in the vehicle body, i.e., the state variables of the vehicle body vibration at a time when a value of a requested driving torque (converted in the unit of a wheel torque) and an estimated value of a present wheel torque are inputted are computed; and then, the driving torque of the driving device (the engine) is adjusted (the requested driving torque is corrected) so that the state variables obtained from the model will be converged into 0, namely, the pitching/bouncing vibration will be suppressed.

Accordingly, first, for the dynamic motion model of the bounce direction and pitch direction of a vehicle body, for example, as shown in FIG. 3(B), the vehicle body is regarded as a rigid body S having a mass M and a moment of inertia I, and suppose that this rigid body S is supported by front wheel suspensions of an elastic modulus kf and a damping factor cf and rear wheel suspensions of an elastic modulus kr and a damping factor cr (sprung mass vibration model of a vehicle body). In this case, the equations of motion in the bounce direction and in the pitch direction of the centroid of the vehicle body can be expressed as shown in the following expression 1.

[Expression 1]

$$M \frac{d^2 z}{dt^2} = -kf(z + Lf \cdot \theta) - \qquad (1a)$$
$$cf\left(\frac{dz}{dt} + Lf \cdot \frac{d\theta}{dt}\right) - kr(z - Lr \cdot \theta) - cr\left(\frac{dz}{dt} - Lr \cdot \frac{d\theta}{dt}\right)$$

$$I \frac{d^2 \theta}{dt^2} = -Lf\left\{kf(z + Lf \cdot \theta) - cf\left(\frac{dz}{dt} + Lf \cdot \frac{d\theta}{dt}\right)\right\} + \qquad (1b)$$
$$Lr\left\{kr(z - Lr \cdot \theta) + cr\left(\frac{dz}{dt} - Lr \cdot \frac{d\theta}{dt}\right)\right\} + \frac{h}{r} \cdot T$$

where Lf and Lr are the distances from the centroid to the front wheel axis and the rear wheel axis, respectively; r is a wheel radius; and h is the height of the centroid from a road surface. In this respect, in the expression (1a), the 1st and 2nd terms are the force components from the front wheel axis, and the 3rd and 4th terms are those from the rear wheel axis, and in the expression (1b), the 1st term is a component of a moment of force from the front wheel axis, and the 2nd term is that from the rear wheel axis. The 3rd term in the expression (1b) is the component of a moment of force exerted around the centroid of the vehicle body by a wheel torque T generated in the driving wheel.

The above-mentioned expressions (1a) and (1b) can be rewritten in the form of a state equation (of a linear system) while displacements z and θ and their rate-of-change dz/dt and dθ/dt in the vehicle body are regarded as a state variable vector X (t), as in the following expression (2a)

$$dX(t)/dt = A \cdot X(t) + B \cdot u(t) \qquad (2a),$$

where X (t), A and B are each,

[Expression 2]

$$X(t) = \begin{pmatrix} z \\ \frac{dz}{dt} \\ \theta \\ \frac{d\theta}{dt} \end{pmatrix}, A = \begin{pmatrix} 0 & 1 & 0 & 0 \\ a1 & a2 & a3 & a4 \\ 0 & 0 & 0 & 1 \\ b1 & b2 & b3 & b4 \end{pmatrix}, B = \begin{pmatrix} 0 \\ 0 \\ 0 \\ p1 \end{pmatrix},$$

and the respective elements, a1-a4 and b1-b4, in the matrix A are given by gathering up the coefficients z, θ, dz/dt, and dθ/dt in the expressions (1a), (1b), which elements are:

$a1 = -(kf+kr)/M; \ a2 = -(cf+cr)/M;$ $a3 = -(kf \cdot Lf - kr \cdot Lr)/M; \ a4 = -(cf \cdot Lf - cr \cdot Lr)/M;$ $b1=-(Lf \cdot kf-Lr \cdot kr)/I;\ b2=-(Lf \cdot cf-Lr \cdot cr)/I;$ $b3=-(Lf^2 \cdot kf+Lr^2 \cdot kr)/I;\ b4=-(Lf^2 \cdot cf+Lr^2 \cdot cr)/I.$ Moreover, u (t) is:

$u(t)=T,$ which is the input of the system expressed with the state equation (2a). Accordingly, from the expression (1b), the element p1 of the matrix B is:

$p1=h/(I \cdot r).$

In the state equation (2a), if $u(t)=-K \cdot X(t)$ (2b), is put, the state equation (2a) will become $dX(t)/dt=(A-BK) \cdot X(t)$ (2c).

Thus, when the differential equation (2c) of the state variable vector X (t) is solved while an initial value $X_0$ (t) of X (t) is set to $X_0(t)=(0,0,0,0)$ (it is assumed that no vibration exists before an input of a torque), the torque value u(t) which suppresses the pitching and bouncing vibration will be determined by determining the gain K which makes the magnitude of X (t), i.e. displacements and their rates of change in time in the bounce and pitch directions, converging to 0. The value obtained by the converting of this torque value u(t) in the unit of engine driving torque is a compensation component to be given to an engine by the vibration damping control.

Gain K can be determined using, what is called, the theory of Optimal Regulator. According to this theory, it is known that, when the value of the evaluation function of a secondary form:

$J=\frac{1}{2}\int(X^TQX+u^TRu)dt$ (3a)

(where the range of the integration is from 0 to ∞.) becomes the minimum, X (t) in the state equation (2a) is stably converged, and the matrix K which makes the evaluation function J to its minimum can be given by:

$K=R^{-1} \cdot B^T \cdot P,$ where P is a solution of the Riccati equation:

$-dP/dt=A^TP+PA+Q-PBR^{-1}B^TP.$

The Riccati equation can be solved by an arbitrary process known in the field of linear systems, and thereby the gain K will be determined.

The Q and R in the evaluation function J and the Riccati equation are a semi-positive definite symmetrical matrix or a positive definite symmetrical matrix which can be set up arbitrarily, respectively, and those are weight matrixes in the evaluation function J to be determined by a designer of the system. For example, in the case of the motion model considered here, Q and R may be set out as, $$Q = \begin{pmatrix} 1 & 0 & 0 & 0 \\ 0 & 10^3 & 0 & 0 \\ 0 & 0 & 1 & 0 \\ 0 & 0 & 0 & 10^2 \end{pmatrix}, R = (1)$$ [Expression 3]

and, in the expression (3a), if a norm (magnitude) of a particular one among the components of a state vector, e.g. dz/dt, dθ/dt, is set out greater than a norm of the other components, e.g. z, θ, the component whose norm is set out greater will more stably converge. Moreover, by setting a larger value for the component of Q, the transient property in the system will be importantly considered, namely, the values of the state vector will be made converged more promptly to stable values, and by setting a larger value for R, the consumption energy in the system will be reduced.

Furthermore, as a dynamic motion model of a vehicle body in the bounce and pitch directions, for example, as shown in FIG. 3(C), a model in which spring elasticities of tires of front and rear wheels are taken into account as well as the structure in FIG. 3(B) may be employed (the sprung mass and unsprung mass vibration model of a vehicle body). When tires of front and rear wheels have elastic modului ktf and ktr, respectively, as seen from FIG. 3(C), the equation of motion in the bounce direction and the equation of motion in the pitch direction for the centroid of a vehicle body are expressed by the following expressions 4:

[Expression 4]

$$M\frac{d^2z}{dt^2} = -kf(z+Lf \cdot \theta - xf) - cf\left(\frac{dz}{dt}+Lf \cdot \frac{d\theta}{dt}-\frac{dxf}{dt}\right) - \quad (4a)$$
$$kr(z-Lr \cdot \theta - xr) - cr\left(\frac{dz}{dt}-Lr \cdot \frac{d\theta}{dt}-\frac{dxr}{dt}\right)$$

$$I\frac{d^2\theta}{dt^2} = -Lf\left\{kf(z+Lf \cdot \theta - xf) - cf\left(\frac{dz}{dt}+Lf \cdot \frac{d\theta}{dt}-\frac{dxf}{dt}\right)\right\} + \quad (4b)$$
$$Lr\left\{kr(z-Lr \cdot \theta - xr) + cr\left(\frac{dz}{dt}-Lr \cdot \frac{d\theta}{dt}-\frac{dxr}{dt}\right)\right\} + \frac{h}{r} \cdot T$$

$$mf\frac{d^2xf}{dt^2} = kf(z+Lf \cdot \theta - xf) + cf\left(\frac{dz}{dt}+Lf \cdot \frac{d\theta}{dt}-\frac{dxf}{dt}\right) + ktf \cdot xf \quad (4c)$$

$$mr\frac{d^2xr}{dt^2} = kr(z-Lr \cdot \theta - xr) + cr\left(\frac{dz}{dt}-Lr \cdot \frac{d\theta}{dt}-\frac{dxr}{dt}\right) + ktr \cdot xr \quad (4d)$$

where xf and xr each are the amounts of displacements of unsprung masses of the front and rear wheels, and mf and mr each are the unsprung masses of the front wheel and rear wheels. Like in the case of FIG. 3(B), the expressions (4a)-(4b) constitute the state equations, where z, θ, xf, xr, and their time differential values are used in a state variable vector, as in the expression (2a) (However, Matrix A becomes a matrix of eight lines and eight sequences, and Matrix B becomes a matrix of eight lines and one sequence), and in accordance with the theory of the optimal regulator, the gain matrix K which makes the magnitude of the state variable vector converging into 0 can be determined.

(Structure of Compensation Component Determining Portion)

The control structure of the compensation component determining portion 52 computing a compensation component U for the above-mentioned pitching and bouncing vibration damping control is shown in FIG. 4. Referring to this drawing, in the compensation component determining portion 52 in FIG. 2, the value, Two, obtained by converting a driving torque requested value from the driving torque demand determining portion 51 in the unit of wheel torque; and (the estimated value of) the wheel torque, Tw, actually generated in a wheel, are inputted to the motion model (The wheel torque estimated value corresponding to a brake operation amount or a steering control amount may also be inputted together); where the differential equation of Expression (2a) is solved using the torque input value T (=Two+Tw), and thereby the state variable vector X(t) is computed out. Then, the value u (t) is computed out by multiplying the state variable vector X(t) by the gain K determined so as to make the state variable vector X(t) converging to 0 or its minimum; and the u(t) is converted to the compensation component U(t) expressed with the unit of driving torque requested value of the engine, and U(t) is transmitted to the adder a1 (As described later, the compensation component U, before its transmission to the adder a1, is multiplied by a control gain in the control gain regulator 52c, and then the value is guarded in the injection quantity limiter 52d). Then, in the adder a1, the compensation component U (t) is subtracted from the driving torque requested value. As understood from expressions (1a) and (1b), a pitching and bouncing vibration system of a vehicle body is a resonance system, and therefore, for an arbitrary input, values of a state variable vector are made substantially of the frequency components of a band having a certain spectral characteristic in which the resonant frequency of the system (about 1-5 Hz) is generally centered. Accordingly, by the structure in which U (t) is subtracted from a requested driving torque, the components of the resonant frequency of the system in the requested driving torque, namely, the components which causes pitching and bouncing vibration in a vehicle body, are reduced or removed so that the pitching and bouncing vibration in the vehicle body will be suppressed.

(Estimation of a Wheel Torque)

The value of an actually generating wheel torque to be inputted into the motion model in FIG. 4 is a value in which the action of disturbance is reflected, and therefore it would be ideal to detect this wheel torque actually with a torque sensor installed at each wheel; however, it is difficult to provide a torque sensor in each wheel of a usual vehicle. So, in the illustrated embodiment, there is employed a wheel torque estimated value, which is estimated with the wheel torque estimator 52c (FIG. 2) from any other value which can be detected in a running vehicle. Typically, the wheel torque estimated value Tw can be estimated with the time differential of a wheel rotational speed ω or a wheel speed value r·ω obtained from a wheel speed sensor of a driving wheel as:

$$Tw = M \cdot r^2 \cdot d\omega/dt \quad (5),$$

where M is the mass of the vehicle and r is a wheel radius. [Supposing the total of the driving forces generated by the respective driving wheels on the ground contact sites on a road surface is equal to the whole driving force of the vehicle M·G (where G is an acceleration), a wheel torque Tw is given by:

$$Tw = M \cdot G \cdot r \quad (5a).$$

Since the acceleration G of the vehicle is given from the differential value of the wheel speed r·ω as:

$$G = r \cdot d\omega/dt \quad (5b),$$

the wheel torque will be estimated as in the expression (5).] In this regard, a wheel torque estimated value may be estimated from a rotational speed of a rotational shaft in the driving system operationally coupled with a driving wheel, such as an engine rotational speed, a transmission rotational speed, a turbine rotational speed, etc., instead of a wheel speed. When the rotational speed ne of the output shaft of the engine or motor of the driving device is used, the wheel rotational speed of the driving wheel will be given by:

$$\omega e = ne \times a \text{ transmission(change gear)'s gear ratio} \times a \text{ differential gear ratio} \quad (6).$$

Further, when the rotational speed no of the output shaft of the transmission is used, it will be given by:

$$\omega o = No \times a \text{ differential gear ratio} \quad (7).$$

Then, the estimated value of the wheel rotational speed w of the driving wheel in the expression (6) or (7) is substituted into the expression (5), and thereby, the wheel torque estimated value will be computed.

(ii) Restriction of a Compensation Component

As already described, in a control of a fuel injection quantity of a diesel engine, a fuel injection quantity, together with controls of a fuel injection rate or a fuel injection period, or such control amounts as an EGR execution amount by an EGR control, a supercharged pressure by a supercharger control, is determined with reference to an engine rotational speed and other operating conditions (the temperature of an engine cooling water or lubricating oil, etc.) so that it can be adapted to such purposes as a combustion improvement for engine exhaust gas cleaning and a catalyst control of exhaust system, etc. Namely, a requested injection quantity outputted from the driving torque requested value determining portion 51 in FIG. 2 is a value adjusted to be adapted to the above-mentioned purposes by taking into account the current operational conditions. If, on this requested injection quantity, a compensation component of the vibration damping control with an amplitude of excessive large magnitude is superimposed, it is not preferable because an execution amount of a fuel injection quantity could become unadapted to the purposes of combustion improvement for cleaning engine exhaust gas, catalyst control of the exhaust system, etc. Thus, in the present invention, in order to make fuel injection quantity variation owing to a compensation component fall within a restriction range which ensures the condition adapted to the purposes of exhaust gas cleaning, etc., the displacement of the compensation component which would deviate from this range is inhibited and thereby excessive change in an execution value of a fuel injection quantity is avoided.

In the system of FIG. 2, a restriction range for a compensation component value, namely, the upper limit value and lower limit value of the range, is given by a map, whose parameters are the present engine revolution number and the present fuel injection quantity, in an injection quantity restriction determining portion 53a. The map may be made by detecting or determining, experimentally or theoretically in advance, allowable ranges of fuel injection quantity, adaptable to purposes such as a combustion improvement for engine exhaust gas cleaning and a catalyst control of exhaust system, with respect to arbitrary combinations of an engine revolution number and a fuel injection quantity, anticipated during the actual running of a vehicle. In the selection of the upper and lower limit values from the map, the engine revolution number may be the one detected by a revolution number sensor; and the fuel injection quantity may be the present execution value of a fuel injection quantity or requested fuel injection quantity. [In this respect, the amount of variation of a fuel injection quantity given by the vibration damping control is small enough compared with a total fuel injection quantity, and thus, in the selection of the upper and lower limit values from the map, it has been experimentally found that, for the value of the fuel injection quantity in referring to the present operational condition of the engine, there are no substantial differences in use of either of a value of the fuel injection quantity, compensated by the vibration damping control, and a value of a not compensated fuel injection quantity.] Further, the upper limit value and lower limit value may be given from an allowable variation width, namely, the restriction range for the pre-compensated, requested injection quantity, and typically, the same value is used in the upper and lower sides; but, these may be different from each other. And, the upper and lower limit values selected from the map are given to the compensation injection quantity limiter 52d, which compulsorily coincides a value of a compensation component with the upper limit value or lower limit value when the compensation component deviates from the restriction range beyond the upper limit value or lower limit value (so called, the upper and lower limit guard process is performed).

(iii) Determination of a Control Gain

As described above, when a restriction process of a compensation component is performed, variation of the compensation component may be leveled off at a limit, and thereby, the variation of a wheel torque requested by the vibration damping control could not be achieved; and also, due to the deformation of the variation wave form of the compensation component, the frequency characteristic and phase characteristic of the wheel torque variation corresponding to the compensation component would vary so that an unexpected frequency component can be generated in the wheel torque. FIG. 5 shows an example of a deformation of a wave form of a compensation component due to a restriction process of the compensation component.

Referring to this drawing, suppose that a certain requested injection quantity (a requested value (pre-compensated)—the round dotted line) is given from the driving torque requested value determining portion 51, and thereby a restriction width for variation of a fuel injection quantity is given as illustrated based on an engine revolution number and a fuel injection quantity at that time. Since a compensation component of the vibration damping control typically consists of sine wave components, a requested value of a fuel injection quantity on which a compensation component has been superimposed (compensated) will be displaced as shown by the thin dotted line. However, a displacement of a compensation component beyond the upper variation limit value and lower variation limit value is forbidden, and therefore, when an amplitude of a compensation component deviates from the restriction width, the displacement is restricted while being leveled off at the limit as shown by the solid line in the drawing. When this leveling off at the limit of the wave form (deformation) occurs, oscillating components including frequency and phase components unexpected in the vibration damping control would be produced, which could cause not only deterioration of the effect of the vibration damping control but also an amplification of pitching and bouncing vibration to be suppressed in a vehicle body or the induction of a different vibration (briefly speaking, the wave form of a compensation component will be prepared so as to make a wheel torque vary in the opposite phase to a vibromotive force of the pitching and bouncing vibration which can be generated in a vehicle body; however, if oscillating components with frequency and phase different from the compensation component arise in a wheel torque because of execution of the vibration damping control, these can cause the amplifying of the vibromotive force or the generation of a vibromotive force of different frequency).

To avoid the deformation of a wave form of variation of a fuel injection quantity by a compensation component as shown in FIG. 5 and thereby to maintain the frequency characteristic and phase characteristic of the compensation component, namely, to maintain the wave forms of the sine wave components in the compensation component, can be achieved by the decreasing of a control gain of the compensation component, i.e., a multiplier factor by which the compensation component is multiplied for adjusting the contribution of the compensation component in an engine driving torque control. However, the restriction width for variation of a fuel injection quantity changes with engine operational conditions (an engine revolution number, a fuel injection quantity), and thus, if the decrease is done so that the compensation component would not be leveled off in any cases, the amplitude of the compensation component would be suppressed low even when the restriction width is large so that the compensation component can be made large, and thereby the operational effect of the vibration damping control would become smaller.

Then, in the present invention, there is provided a structure (Control gain regulator 52c) which adjusts a control gain variably based upon the magnitude of an amplitude of a compensation component and the restriction width for variation of a fuel injection quantity for maintaining the frequency characteristic and phase characteristic of the compensation component and also for preventing unnecessary decrease of the amplitude of the compensation component in accordance with the manners explained in the followings. In the control processes of the control gain regulator 52c, briefly, in principle, the upper limit value and lower limit value for variation of an injection quantity, given from an injection quantity limit value determining portion 53a, are compared with a value of a compensation component; and, if the compensation component value has varied beyond the upper limit value or lower limit value in a half oscillational cycle of the compensation component, then, after that, a control gain is reduced at the time when the displacement of the compensation component becomes 0 (at the time of the end of its half cycle). On the other hand, if the compensation component value has not varied beyond the upper limit value or lower limit value in a half oscillational cycle of the compensation component, then the control gain is increased in either of manners described later at the time of the end of the half oscillational cycle of the compensation component. It should be understood that, in both the decreasing and increasing of a control gain, its change is executed when the displacement of a compensation component becomes 0, and thereby, rapid changes of the compensation component around the changes of the control gain can be avoided (If a control gain is changed when the displacement of a compensation component has a significant value, an unexpected frequency component due to the change of the compensation component would be generated).

Figure 6:
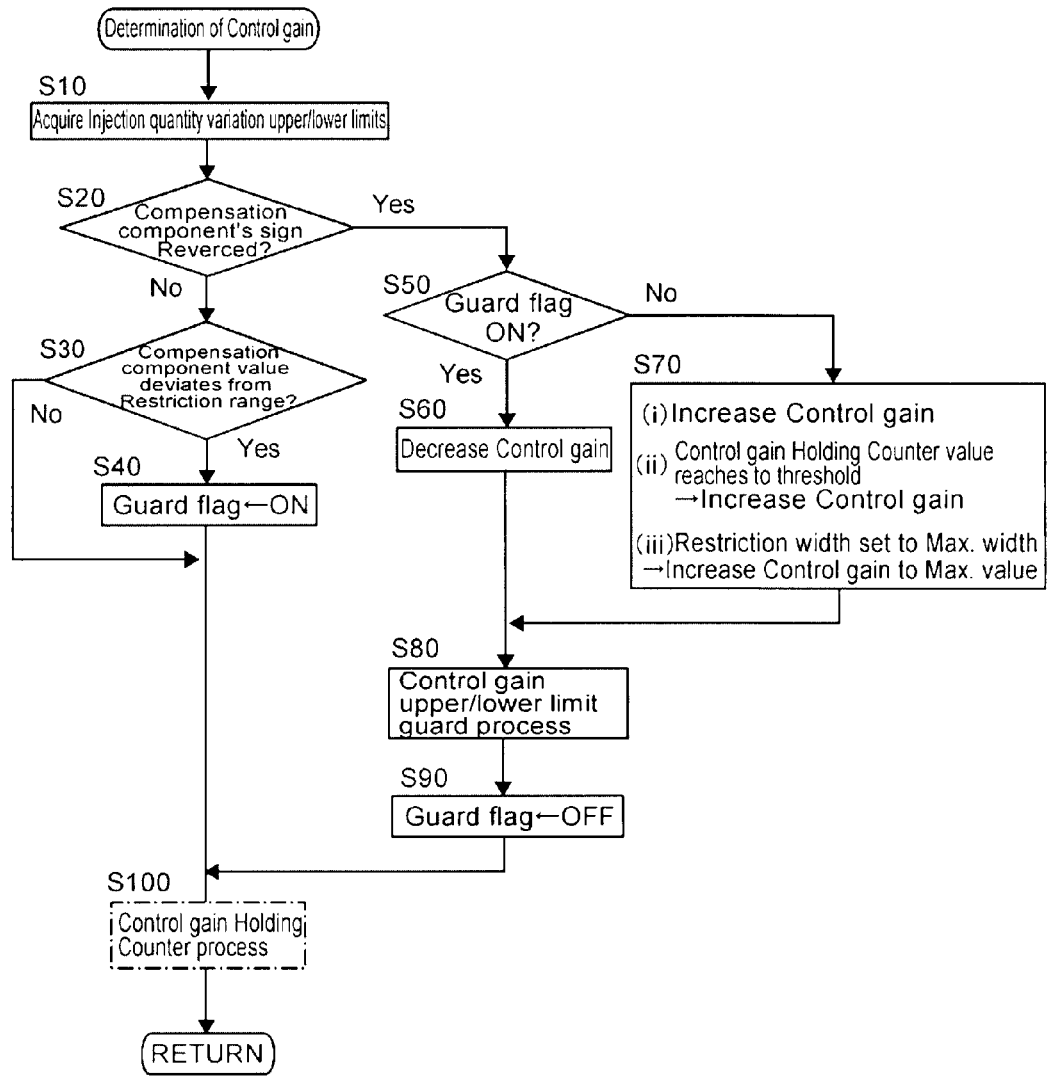
FIG. 6 shows a process of a control gain determination in a control gain regulator 52c in a form of a flow chart.
Figure 7:
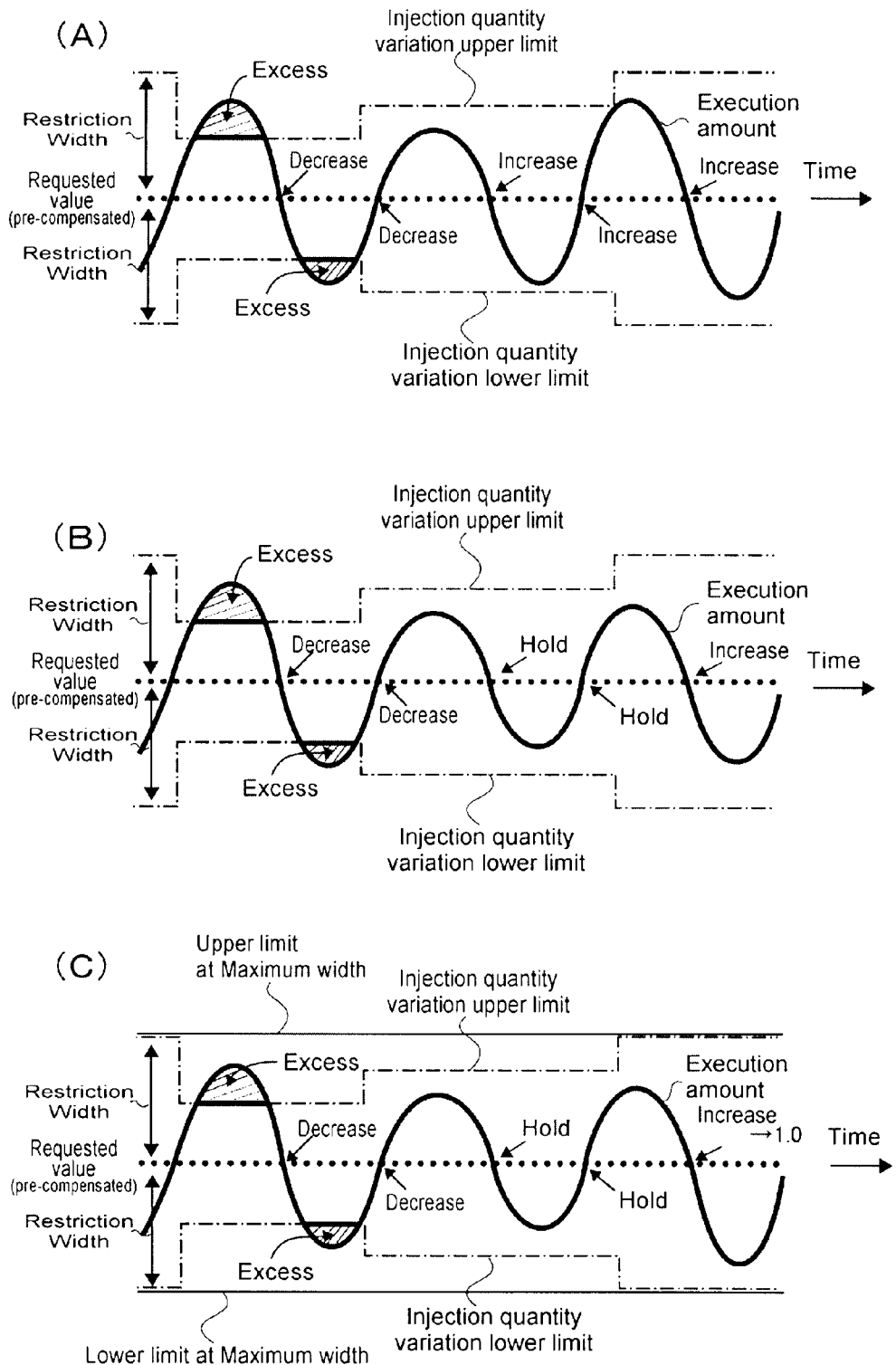
FIG. 7 shows temporal changes of an execution amount of a fuel injection quantity compensated with a compensation component multiplied by a control gain determined by the control process of FIG. 6. The alternate long and short dash line shows restriction values (upper limit value and lower limit value) for variation of a fuel injection quantity; the round dotted line shows a value of a requested injection quantity on which no compensation component is superimposed.

FIG. 6 shows a control process for the determination of a control gain in the control gain regulator 52c in the form of a flow chart, and FIGS. 7 (A)-(C) show examples of variations of execution amounts of fuel injection quantities compensated with compensation components obtained using control gains determined in several modes of the inventive control gain determination process. The process of FIG. 6 may be repetitively executed in the execution of the vibration damping control during the running of the vehicle.

In the control process cycle illustrated in FIG. 6, first, an upper limit value and a lower limit value for injection quantity variation are acquired (step 10). Then, whether the displacement of a compensation component is 0 or not is judged by detecting the reversion of the positive/negative sign of the compensation component (step 20). When the displacement of the compensation component is not 0, whether the value of the compensation component is within a restriction range or not is judged by referring to the relation in magnitude between the compensation component value and the upper limit value and lower limit value for injection quantity variation (step 30), and if the value of the compensation component deviates from the restriction range, a guard flag is set as ON (step 40), and thereby it is memorized that the compensation component has deviated from the restriction range in the present half oscillational cycle.

During the repeating of the control cycle as described above, when the displacement of the compensation component becomes 0 and the reversion of the positive/negative sign of the compensation component is detected, it is judged if the guard flag is ON (step 50). Here, if the guard flag is ON, which means that a deviation of the value of the compensation component from the restriction range has occurred in the just ending half oscillational cycle, the decrease of a control gain is executed (step 60). Then, when the change of the control gain is executed, the guard flag is turned to OFF (step 90—When the reversion of the sign is detected at step 20, it means that one half oscillational cycle has been completed). In this regard, a guard process for a control gain may be performed (step 80) to prevent a control gain from being reduced excessively. Also, in a case of the increase of a control gain explained later, a guard process is executed so as to restrict the increase of the control gain for preventing its value from exceeding beyond 1.0.

A change of a compensation component (an execution amount of a fuel injection quantity) owing to the decreasing of a control gain as described above is illustrated in the left part of FIG. 7 (A). Referring to the drawing, suppose that a displacement of a compensation component increases after passing a zero point (pre-compensated requested value) from the left end of FIG. 7 (A) and then exceeds a limit value (an upper limit value). Then, when the displacement decreases to pass through the zero point, the decreasing of a control gain is executed (at the time point designated "Decrease" in the drawing). Next, in the next half oscillational cycle, if a limiting value (a lower limit value) is passed by the displacement again, the control gain is further reduced at the following zero point. Accordingly, as the decreasing of a control gain is repeated, it becomes possible to prevent the compensation component value from being restricted, while its frequency and phase characteristics are maintained. In this regard, the decrement of a control gain in the above process may be an arbitrarily predetermined quantity, and also it may be determined in accordance with the difference or ratio of the absolute value of a compensation component and the absolute value of an upper limit value or a lower limit value. In the former case, as described above, there is a possibility that, in the half oscillational cycle which starts after the decreasing of a control gain, a compensation component value again deviates from the restriction range, while in the latter case, such a possibility is low, but the amount of calculation increases. Which case is to be employed may be arbitrarily chosen at the time of the designing of the device.

Referring to FIG. 6 again, if the guard flag is OFF when the displacement of the compensation component becomes 0 (step 50), which means that no deviation of the compensation component value from the restriction range has occurred in the just ending half oscillational cycle, then the contribution of the vibration damping control can be increased by increasing the control gain (step 70) (However, the control gain cannot be increased beyond 1.0). Thus, in step 70, in the first mode of the increase of a control gain, the control gain may be increased at every end of a half oscillational cycle as long as a compensation component value has not deviated from the restriction range (step 70(*i*)). A change of a compensation component in this mode is illustrated in the right part of "Execution amount" in FIG. 7 (A). In this case, as understood from the drawing, after the decreasing of a control gain (after twice decreasing in the example of the drawing), if there is no deviation of a value of a compensation component from the restriction range in the subsequent half cycle, the control gain is increased at the time of termination of this half oscillational cycle (at the time point designated "Increase"). And, in each of the further sequentially following half oscillational cycles, if there is no deviation of the compensation component value from the restriction range, the control gain is increased at the end of each half oscillational cycle, thereby increasing the contribution of the compensation component so that good vibration damping control can be achieved.

However, although not illustrated, in a case that the restriction width for variation of a fuel injection quantity remains unchanged or becomes narrow, a deviation of a compensation component value from the restriction range could occur in the half oscillational cycle just after the execution of the increasing of a control gain, so that the decreasing of the control gain could be executed again. Namely, the increase and decrease of a control gain could be repeated frequently, and thereby the stability of the control could be deteriorated (Actually, the opportunities of the leveling off of the wave form at a limit will increase). Thus, in the second mode of step 70, the increase of a control gain may be executed only when half oscillational cycles without deviation of a compensation component value from the restriction range have been repeated in a predetermined number of times or only when a condition without deviation of a compensation component value from the restriction range continues for more than a predetermined duration (step 70 (ii)).

In order to perform this mode for the increase of a control gain, in the control process of FIG. 6, a counter process (control gain holding counter process) may be executed by further preparing a counter for counting the number of continuously repeating half oscillational cycles with no deviation of a compensation component value from the restriction range, or for measuring a predetermined elapsed time, after the execution of the changing of a control gain (including both the decrease case and the increase case). For instance, in a case that the increase of a control gain is executed only when the condition without deviation of a compensation component value from the restriction range continues beyond a predetermined duration, there is provided step 100 shown in the dashed line in FIG. 6, where the counter is reset when the guard flag is ON or when a change of a control gain is executed; and after this, during the repetition of the control cycle, there is performed a counter process in which the counter value increases as long as the guard flag remains OFF and the control gain remain unchanged. And, in the process of step 70, only when the counter value has become beyond a predetermined value, the increase of a control gain is executed (the counter value will be reset in the subsequent step 100). On the other hand, in a case that the increase of a control gain is executed only when the number of continuously repeating half oscillational cycles with no deviation of a compensation component value from the restriction range exceeds beyond a predetermined value, a counter process similar to step 100 may be executed in a arbitrary position before or after steps 80-90 (In that case, the counter process is executed only at the time of reversion of the sign of a compensation component. A judgment of a guard flag needs not be executed).

FIG. 7 (B) illustrates a change of a compensation component in a case that the increase of a control gain is executed in the second mode as described above. Referring to the drawing, the decreasing of a control gain (the left part) is performed as in the above-mentioned case of FIG. 7 (A); however, even if no deviation of a compensation component value from the restriction range occurs, the control gain is held for a certain term (in the illustrated example, for two of half oscillational cycles) (At the time points designated "Hold", the control gain is not changed); and then, if there continues the condition without deviation of the compensation component value from the restriction range, the increase of the control gain is executed.

By the way, in the two above-mentioned modes, the increment in increasing a control gain may be a predetermined amount; however, if the increment in one time is small in comparison with the difference between the restriction width for an injection quantity and an amplitude of a compensation component, then the increase of a control gain is slow so that it would take a long time to make the contribution of the vibration damping control enlarged. Further, especially in the second mode, since it is designed that a control gain is increased after waiting for the continuation of the condition without deviation of a compensation component value from the restriction range for a certain term, the time length until the control gain increases enough will be still longer. Thus, in the third mode for the increase of a control gain in step 70, it may be designed that, when the restriction width for variation of an injection quantity is set to its maximum width in the injection quantity restriction determining portion 53*a*, a control gain is set to its maximum value, 1, (step 70 (iii)). Here, the maximum width of the restriction width for variation of a fuel injection quantity is, briefly, the width in the case that the absolute values of the upper limit value and lower limit value are their maximums in the map determining the upper limit value and lower limit value for variation of a fuel injection quantity according to engine operational conditions. When the absolute values of the upper limit value and lower limit value become the maximums, the necessity of executing the restriction of variation of a fuel injection quantity becomes the lowest (Usually, an amplitude of a compensation component is adjusted so as to fall within the maximum width of variation of a fuel injection quantity in any cases). Thus, in that case, it may be designed that a control gain is increased to its maximum so that no decrease of an amplitude of the compensation component by the adjustment of a control gain will be executed. According to this structure, the increase of contribution of a compensation component in a fuel injection quantity can be achieved more promptly than in the above-mentioned two modes for the increase of a control gain.

In the process during the execution in the third mode, whether or not the restriction width (the absolute values of the upper limit value and lower limit value) for variation of the fuel injection quantity is set to the maximum width is judged in step 70 of FIG. 6; and when the restriction width is set to the maximum width, a control gain is set to 1.0. Since whether or not the restriction width is set to the maximum can be known in the injection quantity restriction determining portion 53*a*, the control gain regulator 52*c* may be adapted to receive from the injection quantity restriction determining portion 53*a* the information on whether or not the restriction width is set to the maximum. In this regard, in this case, the increase of a control gain in accordance with the judgment of a counter value in the above-mentioned second mode may also be executed in step 70. When the restriction width is set to the maximum width, the increase of a control gain is executed while overcoming the determination of the holding or increase of the control gain based on the counter value judgment.

FIG. 7 (C) illustrates a change of a compensation component in a case that the increase of a control gain is executed in the third mode as well as in the second mode. Referring to the drawing, the decreasing of a control gain (the left part in the drawing) is executed as in the case of the above-mentioned FIG. 7 (A), and then the control gain is held for a while (two half oscillational cycles in the illustrated example) if no deviation of a compensation component value from the restriction range occurs; however, after that, when the restriction width is set to the maximum width, the control gain is increased to 1.0 (at the time point designated "Increase→1.0")

(iv) Application of a Control Gain

A control gain, determined in the control gain regulator as described above, is multiplied on a compensation component from the compensation component determining portion 52, and as already noted, the compensation component is converted in the unit of an injection quantity, and, after passed though the compensation injection quantity limiter 52*d*, it is superimposed on a requested injection quantity (pre-compensated) in the adder a1. In this process, the control gain λ, determined in FIG. 6, is multiplied by a compensation component U of the vibration damping control, and $$\lambda \cdot U \tag{8}$$

is outputted toward the adder a1.

(v) Another Mode of the Determination of a Control Gain

Adjustment of a control gain for maintaining the frequency characteristic and phase characteristic of a compensation component and also for preventing unnecessary reduction of an amplitude of the compensation component can be achieved by increasing or decreasing the control gain based upon the magnitude of a restriction width for variation of a fuel injection quantity. Concretely, with the magnitude of an upper or a lower limit value, selected based on the present operational condition of the engine in the injection quantity restriction determining portion 53*a*, and the maximum value for the magnitude of the upper or lower limit value, a control gain may be given by:

$$\lambda = \text{(the magnitude of the present upper or lower limit value)/(the maximum of the magnitude of the upper or lower limit value)} \tag{9}$$

(If the restriction widths mutually differ in the upper and lower sides, the smaller ratio should be chosen). As noted, since the displacement of a compensation component is not restricted when the magnitudes of the upper limit value and lower limit value are set to the maximum value, the control gain λ=1 is set out when the sizes of the present upper and lower limit values are equal to the maximum value for the magnitude of the upper and lower limit values. In this regard, also in a case that a control gain is determined as described above, it is preferable to execute the change of a control gain when the displacement of the compensation component is 0, for ensuring the continuity of the displacement of the compensation component around the change of the control gain.

Figure 8:
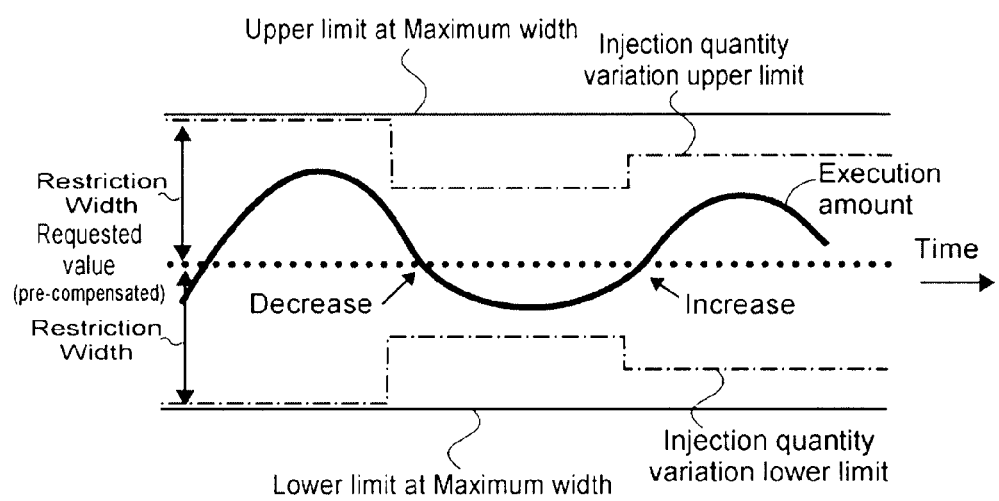
FIG. 8 shows a temporal change of an execution amount of a fuel injection quantity compensated with a compensation component multiplied by a control gain determined with a ratio of a restriction width for variation of a fuel injection quantity and its maximum width (Expression (9)). The alternate long and short dash line shows the limit values (upper limit value and lower limit value) for variation of a fuel injection quantity; the round dotted line shows a value of a requested injection quantity on which the compensation component is not superimposed.

FIG. 8 illustrates a change of a compensation component in a case that a change of a control gain, determined by Expression (9), is executed when the displacement of the compensation component is 0. Referring to the drawing from its left end, when the upper limit value and lower limit value are reduced so that the restriction width becomes narrower, then, after that, the decreasing of a control gain is executed when the displacement of the compensation component (Execution amount) becomes 0. After this, also when the restriction width is widened, the increase of the control gain is executed when the displacement of the compensation component (Execution amount) becomes 0, and thereby the continuity of the value of the compensation component is ensured.

As mentioned above, according to the above-mentioned embodiments, it becomes enabled to reflect a compensation component in an execution amount of a fuel injection quantity in a manner that the frequency characteristic and phase characteristic of the compensation component are maintained and also unnecessary reduction of an amplitude of the compensation component is prevented. It should be understood that, in any of the above-mentioned modes, the adjustment of a control gain is performed appropriately without detecting an amplitude of a compensation component. Since the oscillational characteristic of a compensation component, i.e., an amplitude, a phase and a frequency are dependent on the characteristics of a vibromotive force capable of generating vibration (principally, the frequency is near the resonance frequency), usually, calculation processes, such as frequency analysis of a compensation component, are required for detecting the amplitude; however, in the present invention, the adjustment of a control gain is simply and appropriately possible in accordance with the relation in magnitude between the displacement of a compensation component and the limit values for variation of a fuel injection quantity or the relation between the limit values for variation of a fuel injection quantity and their maximum value.

Although the above explanation has been described with respect to embodiments of the present invention, it will be apparent for those skilled in the art that various modifications and changes are possible, and that the present invention is not limited to the above-illustrated embodiments and may be applied to various devices and apparatus without deviating from the concepts of the present invention.

For instance, although a wheel torque estimated value in the above-mentioned embodiments is estimated from a wheel speed, the wheel torque estimated value may be those to be estimated from a parameter other than a wheel speed. Further, although the vibration damping control in the above-described embodiments is a vibration damping control in which the sprung mass motion model or sprung mass and unsprung mass motion model is assumed for the motion model to be used and the theory of the optimal regulator is used, the concept of the present invention may be applied for controls performing the damping of arbitrary vibration in a vehicle body while using any motion model other than those being introduced here and/or control methods other than the optimal regulator, if utilizing a wheel torque, and such cases are included within the scope of the present invention.

Moreover, although, in the example of FIG. 2, a control command in performing compensation calculation of a driving output by a vibration damping control are expressed and processed in the unit of requested fuel injection quantity, it is possible to perform calculation processes while converting a fuel injection quantity in the unit of wheel torque value or driving torque value and expressing a driving torque requested value in the unit of torque.

The invention claimed is:

1. A vehicle vibration damping control device for suppressing vibration of a vehicle body by controlling a driving output of a vehicle having a diesel engine as a driving device, comprising:
   a compensation component computing portion which, based on a wheel torque generated on a ground contact site of a wheel of the vehicle and a road surface and acting on the wheel, computes a compensation component which compensates the wheel torque to suppress an amplitude of the vibration of the vehicle body; and
   a control gain determining portion which determines a control gain for the compensation component in superimposing the compensation component on a requested value of a driving torque to the engine,
   wherein, at a time point of a reversion of a sign of a value of the compensation component, the control gain determining portion decreases the control gain if the value of the compensation component has deviated from a restriction range for variation of a fuel injection quantity determined based on an operational condition of the engine in a term between the time point and a preceding time point of a reversion of a sign of the value of the compensation component, and increases the control gain if the value of the compensation component has not deviated from the restriction range for variation of the fuel injection quantity of the engine in the term.

2. The device of claim 1, wherein the control gain is increased when the value of the compensation component has not deviated from the restriction range for variation of the fuel injection quantity of the engine during a predetermined number of times of occurrences of reversions of the sign of the value of the compensation component or for a predetermined duration.

3. The device of claim 1, wherein the control gain is increased to its maximum value at a first time of the reversion of the sign of the value of the compensation component after a width of the restriction range for variation of the fuel injection quantity of the engine is set to a predetermined maximum width of the restriction range.

4. The device of claim 2, wherein the control gain is increased to its maximum value at a first time of the reversion of the sign of the value of the compensation component after a width of the restriction range for variation of the fuel injection quantity of the engine is set to a predetermined maximum width of the restriction range.

5. A vehicle vibration damping control device for suppressing vibration of a vehicle body by controlling a driving output of a vehicle having a diesel engine as a driving device, comprising:
   a compensation component computing portion which, based on a wheel torque generated on a ground contact site of a wheel of the vehicle and a road surface and acting on the wheel, computes a compensation component which compensates the wheel torque to suppress an amplitude of the vibration of the vehicle body; and
   a control gain determining portion which determines a control gain of the compensation component in superimposing the compensation component on a requested value of a driving torque to the engine,
   wherein the control gain determining portion determines the control gain based upon a ratio of a presently set width of a restriction range for variation of a fuel injection quantity determined based on an operational condition of the engine to a predetermined maximum width of the restriction range.

6. The device of claim 5, wherein the determination of the control gain is executed at a time point of a reversion of a sign of the value of the compensation component.

7. A vehicle vibration damping control device for suppressing vibration of a vehicle body by controlling a driving output of a vehicle having a diesel engine as a driving device, comprising:
   a control gain determining portion which varies an amplitude of a compensation component to be superimposed on a requested value of a driving torque of the vehicle for suppressing the vibration of the vehicle body based on a restriction range for variation of a fuel injection quantity determined based on an operational condition of the engine.

8. The device of claim 7, wherein the operational condition of the engine is based on an engine rotational number and a fuel injection quantity.

* * * * *